(12) United States Patent
Alverson et al.

(10) Patent No.: US 6,427,098 B1
(45) Date of Patent: Jul. 30, 2002

(54) METHOD FOR CONTROLLING PIVOTING MACHINE MEMBER

(75) Inventors: Steven E. Alverson; Kirby L. Stone, both of Cincinnati, OH (US)

(73) Assignee: UNOVA IP CORP, Woodland Hills, CA (US)

( * ) Notice: Subject to any disclaimer, the term of this patent is extended or adjusted under 35 U.S.C. 154(b) by 0 days.

(21) Appl. No.: 09/535,664

(22) Filed: Mar. 22, 2000

Related U.S. Application Data

(60) Provisional application No. 60/125,442, filed on Mar. 22, 1999.

(51) Int. Cl.[7] .............................................. G06F 19/00
(52) U.S. Cl. ...................... 700/245; 700/180; 700/251; 700/249; 700/262; 700/263; 700/252; 700/248; 318/568.1; 318/568.15; 318/568.18; 318/568.19; 318/568.23; 901/14; 901/15; 901/16
(58) Field of Search .................................. 700/245, 180, 700/172, 83, 84, 97, 104, 165, 262, 263, 251, 252, 248, 249, 188; 318/568.19, 632, 561, 569, 616, 603, 568.15, 568.18, 568.23, 568.1, 574, 615, 617, 594; 901/2, 14–16, 819; 701/27, 23

(56) References Cited

U.S. PATENT DOCUMENTS

| | | | | |
|---|---|---|---|---|
| 3,789,717 A | * | 2/1974 | Stolzer ........................... 83/796 |
| 4,200,827 A | * | 4/1980 | Oswald ........................ 318/561 |
| 4,491,776 A | * | 1/1985 | Veale .......................... 318/561 |
| 4,506,335 A | * | 3/1985 | Magnuson .................... 700/252 |
| 4,538,233 A | * | 8/1985 | Resnick et al. ............... 700/252 |
| 4,598,380 A | * | 7/1986 | Holmes et al. ............... 318/632 |
| 4,643,622 A | | 2/1987 | Winski |
| 4,751,441 A | * | 6/1988 | Lewis .......................... 318/439 |
| 4,937,759 A | * | 6/1990 | Vold ............................ 700/262 |
| 5,357,450 A | | 10/1994 | Hemmerle et al. |
| 5,377,454 A | | 1/1995 | Pedersen et al. |
| 5,438,178 A | | 8/1995 | Buhler et al. |
| 5,563,484 A | | 10/1996 | Otsuki et al. |
| 5,580,298 A | | 12/1996 | Stadtfeld |
| 5,834,623 A | | 11/1998 | Ignagni |
| 6,112,133 A | | 8/2000 | Fishman |

FOREIGN PATENT DOCUMENTS

WO     WO-00 57255     * 9/2000

OTHER PUBLICATIONS

Tso et al., Hidden Markov model for intelligent extraction of robot trajectory command form demonstrated trajectories, 1996, IEEE, pp. 294–298.*

Gregorio et al., Mobility analysis of the 3–UPU parallel mechanism assembled for a pure translation motion, 1999, IEEE, pp. 520–525.*

* cited by examiner

Primary Examiner—William A. Cuchlinski, Jr.
Assistant Examiner—McDieunel Marc
(74) Attorney, Agent, or Firm—Daniel C. Stelter

(57) ABSTRACT

A method and apparatus for control of pivoting machine members propelled by linear actuators so as to permit coordinated motion of the pivoting members with translating machine members. Position commands for the pivoting machine members are given in angular units. The propelling linear actuators are controlled by servomechanism control providing position and velocity control. Position measurements for the pivoting members measure linear displacement of the propelling actuator. Position commands for the pivoting members are compensated according to the non-linear relationship between displacement of the propelling actuator and the angular displacement of the pivoting member.

18 Claims, 4 Drawing Sheets

METHOD FOR CONTROLLING PIVOTING MACHINE MEMBER

CROSS-REFERENCE TO RELATED APPLICATIONS

The present application claims priority under 35 U.S.C.§119(e) from our pending U.S. provisional patent application Ser. No. 60/125,442, filed on Mar. 22, 1999, entitled "Method for Controlling Pivoting Machine Member", said '442 application being incorporated herein by reference.

BACKGROUND OF THE INVENTION

1. Technical Field of the Invention

The present invention relates to numerical control of machines. More particularly, the present invention relates to numerical control of machines, wherein a pivoting machine member is controllably propelled by one or more linear actuators.

2. Brief Description of the Related Art

Machines with pivoting members, particularly members for orienting a tool, and more particularly, a cutting tool, are well known. A conventional machine arrangement provides a spindle assembly for holding and rotating a cutting tool wherein the spindle assembly is provided relative to two (2) intersecting axes of rotation. Linear actuators propel the pivoting members to alter the orientation of the axis of rotation of the tool. Conventional numerical controls for such pivoting members provide position commands for the orientation specified in angular units, e.g., degrees or radians. However, the relationship between linear displacement of the propelling actuator and angular displacement of the machine member is non-linear. Hence, control of position of the propelling actuator in response to angular position commands must be effected through measurement of actual position of the pivoting member or through a non-linear position control algorithm.

It is conventional to control machine members with a servomechanism control implementing, at least, position and velocity control. In conventional systems, velocity commands are produced in response to differences between commanded and actual position, the magnitude of the position error defining the magnitude of the velocity command. To permit coordinated motion of multiple machine members, position commands are periodically generated, the magnitude of the position commands being a function of the rate of command generation and the commanded rate of motion of the machine members. Hence, to produce constant velocity, position commands defining displacements of equal magnitude are generated at a constant rate.

Because of the non-linear relationship between the linear displacement of the propelling actuator and the angular displacement of the pivoting member, the conventional control scheme will not result in the intended control velocity of the pivoting member absent a corresponding non-linear control algorithm, irrespective of whether position commands are generated in angular units defining orientation or linear units defining displacement of the propelling actuator. Hence, while measurement of actual actuator position of the pivoting machine member is satisfactory for servomechanism control of position, it is not satisfactory for servomechanism control of velocity to produce coordinated motion of machine members. However, conventional numerical controls do not provide such control algorithms.

SUMMARY OF THE INVENTION

It is an object of the present invention to provide control of pivoting machine members propelled by linear actuators to permit coordinated motion with translating machine members.

It is a further object of the present invention to provide control of pivoting machine members propelled by linear actuators wherein position measured for control of the pivoting member is displacement of the propelling actuator.

It is a further object of the present invention to provide control of pivoting machine members propelled by linear actuators wherein position commands for the pivoting machine members are given in angular units, measured position for control of the pivoting member is displacement of the propelling actuator, scaling is effected to match measured position units to command position units, and command position values are compensated to account for the non-linear relationship between displacement of the propelling actuator and orientation of the pivoting member.

These and additional objects, features and advantages of the present invention will become apparent to those reasonably skilled in the art from the description which follows, and may be realized by means of the instrumentalities and combinations particularly pointed out in the claims appended hereto.

In accordance with the aforesaid objects, the present invention provides control of pivoting machine members propelled by linear actuators so as to permit coordinated motion of the pivoting members with translating machine members. Position commands for the pivoting machine members are given in angular units. The propelling linear actuators are controlled by servomechanism control providing position and velocity control. Position measurements for the pivoting members measure linear displacement of the propelling actuator. Position commands for the pivoting members are compensated according to the non-linear relationship between displacement of the propelling actuator and the angular displacement of the pivoting member.

BRIEF DESCRIPTION OF THE DRAWINGS

A better understanding of the present invention will be had upon reference to the following description in conjunction with the accompanying drawings in which like numerals refer to like parts, and wherein.

DETAILED DESCRIPTION OF THE PREFERRED EMBODIMENTS

Figure 1:
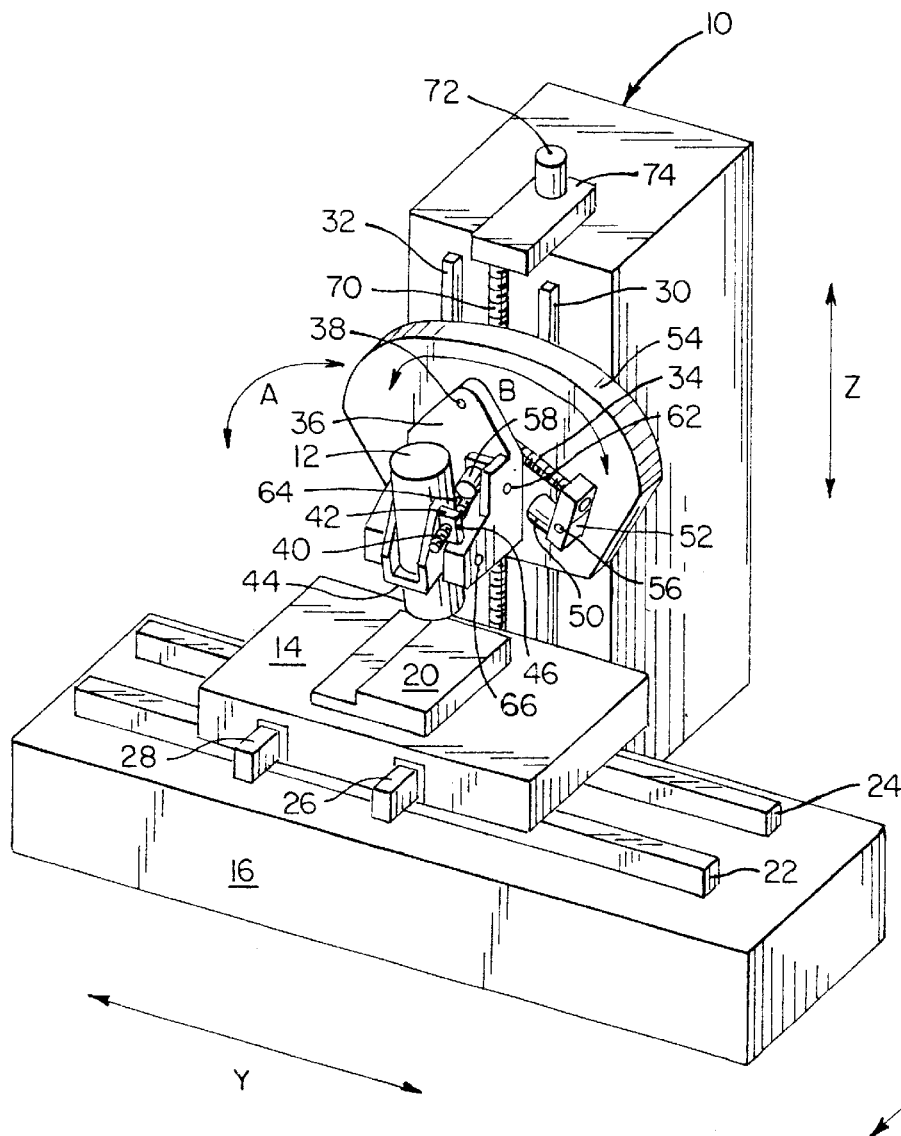
FIG. 1 is a schematic representation of a machine having pivoting members and translating members to be controlled for coordinated motion.

With reference to FIG. 1, machine 10 effects relative motion between tools rotatably retained in spindle 12 and a workpiece 20 clamped to table 14. Table 14 is translatable relative to machine base 16 parallel to two (2) orthogonal axes (indicated in FIG. 1 by the arrows labeled "X" and "Y"). Table 14 may advantageously include a plate (not shown) rotatable about an axis perpendicular to the plane defined by the X and Y axes. Spindle 12 is translatable parallel to an axis (indicated in FIG. 1 by the arrow labeled "Z") perpendicular to the plane defined by the X and Y axes. Further, spindle 12 is pivotably mounted in two (2) intersecting planes, the swings about the pivot points being indicated in FIG. 1 by the arcs labeled "A" and "B".

Translating primary machine members, that is, those which are translated parallel to the X, Y and Z directions, are translatably mounted to fixed guides or rails 22, 24, 26, 28 and 30, 32, respectively, and may be supported directly thereon, with friction reducing films, or indirectly by, for example, roller or other bearings. Translational motions may be effected by linear actuators as are well known, including linear electric motors, hydraulic linear actuators, and rotary converters, such as rack-and-pinion drives or screw-and-nut drives. For example, screw 70 and a cooperating nut (not shown) translates carrier plate 54 when screw 70 is rotated by moor 72 through transmission 74.

To achieve tilt of spindle 12 parallel to arcs A, B, carrier mount 36 is pivotably mounted to carrier plate 54 at pivot point 64 and carrier 44 is pivotably mounted to carrier mount 36 by trunion 66. Pivot of spindle 12 through the B swing is effected by screw 34 acting though a nut (not shown) pivotably mounted to carrier mount 36 at pin 38. Screw 34 is driven by motor 50 through transmission 52 pivotably mounted to carrier plate 54 at pin 56. Pivot of spindle 12 through the A swing is effected by screw 40 acting through nut 42 mounted to spindle carrier 44. Screw 40 is driven by motor 58 through transmission 60 pivotably mounted to carrier mount 36 at pin 62.

It will be appreciated that the pivotable mounting of crank arm drive nuts at pins 38, 46 permits screws 34, 40, respectively, to swing as necessary to remain tangent to the respective radial offset from the pivot points of the A and B swings.

Figure 2B:
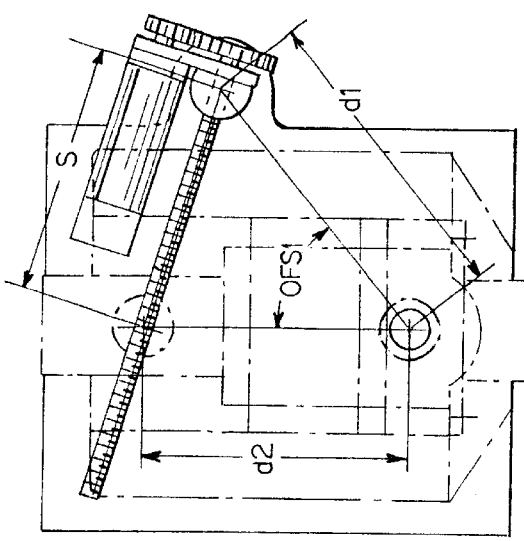
FIG. 2b is a diagram illustrating the relationship of linear displacement to angular position change of the pivoting machine members of FIG. 1.
Figure 2A:
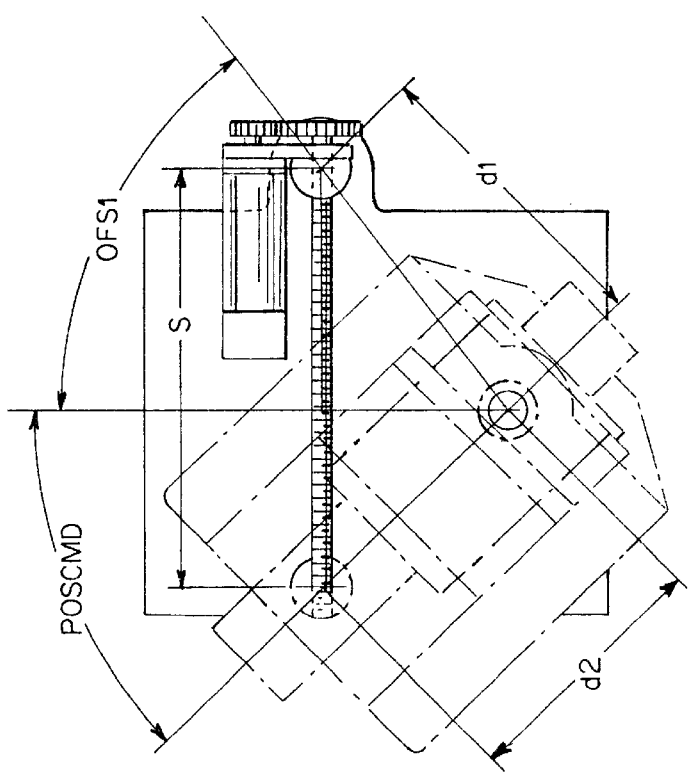
FIG. 2a is a diagram illustrating the relationship of linear displacement to angular position change of the pivoting machine members of FIG. 1.

Referring to the diagram of FIG. 2, it is seen that as the machine members pivot, the relationship between relative displacement of nut and screw to angular position of the pivoting machine members is non-linear, that is the relationship changes over the range of pivoting motion according to the magnitude of the pivot angle.

Control of the machine 10 is accomplished by a numerical control, that is, a control responding to numeric input data to effect operation of machine mechanisms and to control motion of machine members. Such controls are well known, and commonly comprise program controlled digital computers or digital computer components executing control system programs which define and control cycles of operation of the machine. Such numerical controls are referred to as "computer numerical controls," and FIG. 3 is a block diagram of such a computer numerical control (CNC).

Figure 3:
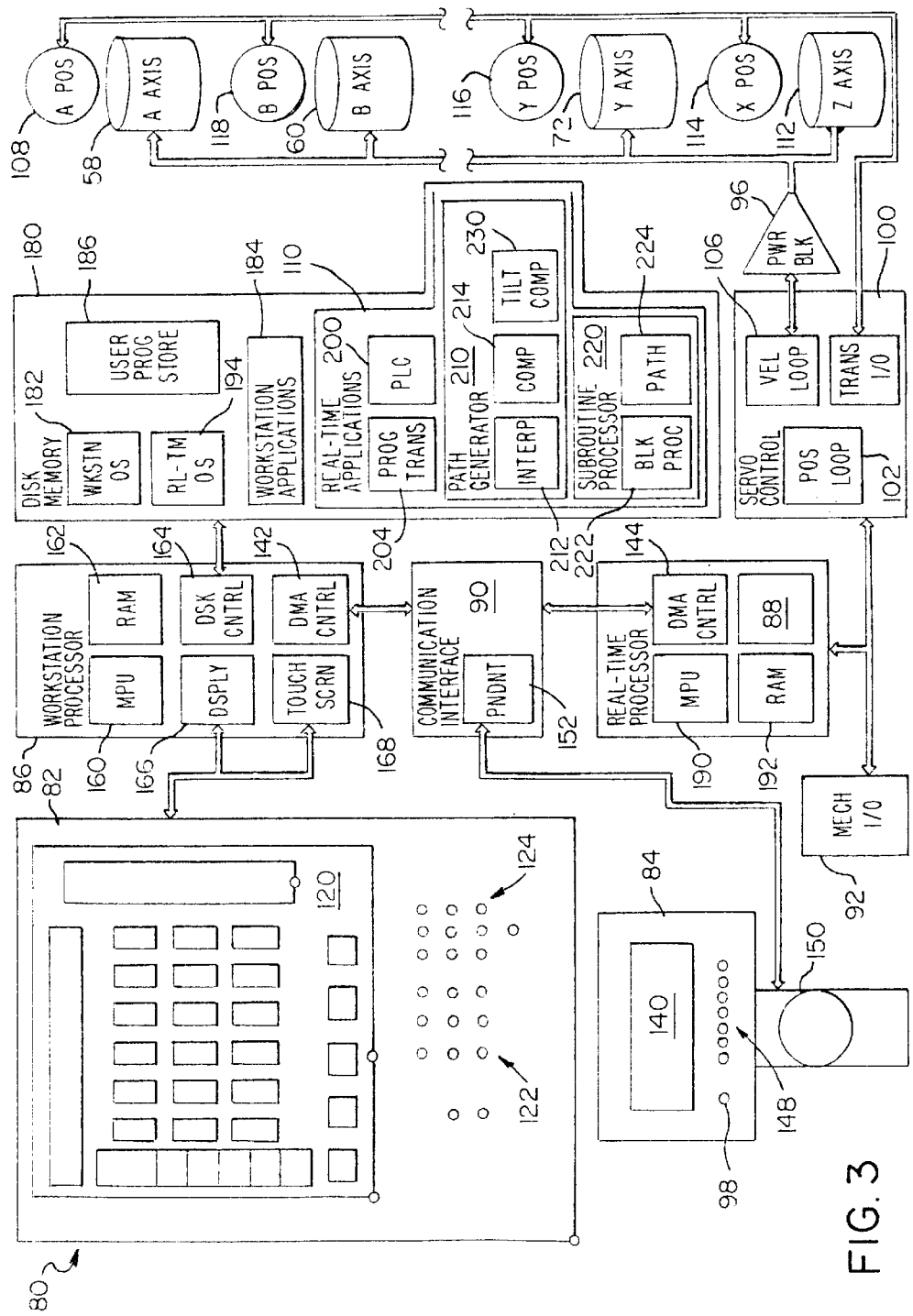
FIG. 3 is a block diagram of a machine control in accordance with the invention.

Referring to FIG. 3, CNC 80 includes an operator station 82, an operator pendant 84, a workstation processor 86, a real-time processor 88, a communication interface 90, mechanism interface 92 and a servo control 100. CNC 80 effects control of machine mechanisms including servo controlled actuators such as motors 50, 58, 72 and 112 in response to various layers of programs. Fundamental control of execution of programs is achieved with operating system environment programs. Application programs executed under control of the operating system environment programs define functioning of facilities of CNC 80, for example, functioning of workstation processor 86 and real-time processor 88. Mechanism control programs created according to the structure and operation of machine mechanisms are executed under control of processor application programs to control functioning of machine devices. Under programs created according to a programming convention, such as, for example, EIA RS 274, are executed under control of processor application programs to effect operation of a controlled machine, such as, machine 10, to perform, for example, machining of a workpiece.

Operator pendant 84 includes a display 140, push buttons 148, Cycle Start push button 98 and manual feed control 150. Machine member position coordinates, active functions and machine status are displayed on display 140. The pendant 84 permits an operator to manually direct movement of servo controlled machine members and to initiate execution of program controlled machine cycles of operation.

Operator station 82 includes a display device 120 and push buttons 122. Display device 120 is preferably fitted with a touch screen having a surface for detecting contact and producing outputs indicating the location of the contact. To facilitate operator selections from display device 120, displays are generated with defined contact areas. When contact of the touch screen of display device 120 occurs within a defined contact area, programmed response is initiated. A numeric keypad 124 is provided for numeric data input.

Mechanism input and output interfaces 92 provide electrical signal interface circuits between machine mechanisms such as mechanical push buttons, lights, solenoids, relays and limit switches and logic circuitry of CNC 80.

Servo control 100 responds to position commands and feed forward commands to effect servo control of actuators such as motors 50, 58, 72, 112. Each servo controlled actuator has an associated position transducer such as transducers 108, 114, 115, 116, 117, 118. Preferably these are encoders producing two (2) output signals in which amplitude translations of, for example, binary values or slope direction, occur in quadrature as relative position of encoder elements change, permitting detection of position and direction. The transducers 108, 114, 115,116, 117, 118 are connected with transducer input/output interface circuitry 104. Servo control 100 includes position loop controller 102 which compares position commands with measured position determined from the position transducers to generate velocity commands. Velocity loop controller 106 responds to velocity commands and velocity feed forward commands to produce actuator control signals. The actuator control signals are used to control power delivered to the actuators through power control devices, such as transistors, located at power block 96. Power for the actuators is typically derived from a three-phase AC source which is converted to DC and pulse width modulated by power transistors, located at power block 96. Servo control 100 may be included as an element of CNC 102 or supplied independently. Alternatively, a position loop controller, such as controller 102, may be included within CNC 80 while a velocity loop controller, such as controller 106, is supplied independently.

Workstation processor 86 controls operation of operator station 82, effecting the display of data according to the active mode of operation of CNC 80 and enabling entry of data using the touch screen of display device 120, push buttons 122 and numeric keypad 124. Workstation processor 86 facilitates enabling creation, storage and editing of user programs.

Real-time processors 88 effects control of machine mechanisms by monitoring signals reflecting the condition or status of machine devices and producing control signals in accordance with current device conditions and user commands. It is the nature of such control that processing of data be accomplished to keep pace with changing conditions and commands, hence performed in "real-time." Real-time data processor 88 effects path generation, that is, produces coordinated motion of machine members to effect relative motion of a tool and workpiece along prescribed paths, in response to user programs. The present invention is concerned with facilitation of this aspect of control as it relates to tilt of spindle 12 by linear actuators.

Data communication between workstation processor 86 and real-time processor 88 is effected through communication interface 90 permitting exchange of control signals for direct memory access (DMA) transfers between respective DMA controllers 142, 144 of workstation processor 86 and real-time processor 88, respectively. Communication interface 90 includes pendant interface 152 permitting exchange of signals with pendant 84. Display signals generated by real-time processor 88 are output through pendant interface 152 and push button signals output from pendant 84 are received by pendant interface 152.

Referring to FIG. 3, workstation processor 86, shown connected to operator station 82, comprises a personal computer processor printed circuit board including a microprocessor 160, random access memory 162 and a direct memory access (DMA) controller 142. Programs controlling the operation of operator station 82 are executed by microprocessor 160 from random access memory 162. Workstation processor 86 includes disk controller 164 for controlling transfer of programs and data to and from disk memory 94. Workstation processor 86 includes program controlled interfaces to effect data input and output including display controller 166 and touch screen and keyboard interface 168. Display controller 166 generates data and control signals for the display device 120 to produce images as required by the operation of CNC 80. Touch screen interface 168 decodes outputs from the touch screen of display device 120 to indicate that contact has been made and to decode the location of the contact. Additionally, interface 168 decodes outputs from numeric keypad 124 to produce numeric values.

The overall functioning of workstation processor 86 is program controlled, the control programs being stored on disk memory 94. An underlying workstation operating system 182 for the workstation preferably provides a multi-tasking environment for program execution, i.e., allowing application programs to be simultaneously active. An example of a suitable operating system is the operating system distributed by Microsoft Corporation of Seattle, Washington, under the registered trademark WINDOWS NT. The WINDOWS NT operating system provides a preemptive multi-tasking environment and permits initiation of execution of any compatible application program during execution of any other application program. Workstation application programs 184 control generation of display data, enable use of the touch screen of display device 120 and effect CNC responses to touch screen and keypad inputs. Workstation application programs include application management control programs which control selection of operating modes of CNC 80 and automatic numerically controlled (NC) programs which control workstation operation in connection with automatic execution of stored user programs. Program control of operator station 82 in accordance with known techniques is adequate for practice of the present invention.

Referring to FIG. 3, real-time data processor 88 comprises a personal computer processor printed circuit board, preferably including a microprocessor 190, random access memory 192 and a DMA controller 144. Real-time data an processor 88 is program controlled, the programs being executed by microprocessor 190 from random access memory 192. Execution of real-time application programs 110 are controlled by a real-time operating system program 194. Real-time operating system programs 194 and real-time application programs 110 are loaded from disk memory 94 to random access memory 192 on initialization of CNC 80, for example, when power is applied. Program transfer of real-time application programs 110 from disk memory 94 to random access memory 192 of real-time processor 88 occurs through data communication interface 90. Real-time application programs 110 include programmable logic controller routines 200, program translator routines 204, path generator routines 210, and subroutine processor routines 220. Of these, programmable logic controller routines 200 and path generator routines 210 control operation of machine mechanisms through mechanism interfaces 92 and servo control 100, respectively. Program translator routines 204 control execution of instructions of user programs conforming to an adopted programming convention.

Programmable logic controller routines 200 control execution of instructions of mechanism control programs defining relationships between input and output signals related to machine devices electrically interfaced through mechanism input and output interfaces 92. As is conventional, programmable logic controller routines 200 control periodic sampling of input signals and production of control signal values in accordance with control algorithms implemented by mechanism control programs. The mechanism control programs typically define a sequence of operation of machine devices to accomplish a machine mechanism function. Tool exchanges, workpiece pallet transfers, and spindle transmission gear changes are typical of functions implemented by such control programs. Techniques for providing such program control of machine mechanisms and for implementing program controlled execution of such mechanism control programs are well known and known techniques are suitable for practice of the present invention.

Program translator routines 204 effect interpretation of user program instructions and generation of inputs for programmable controller routines 200 and path generator routines 210. In response to execution of user program instructions, CNC 80 performs a sequence of operations conforming to the description of the adopted user programming convention. The user program instructions comprise program codes such as, for example, preparatory codes defining cycles of operation such as drilling operations, coordinate axis codes defining commanded positions, auxiliary coordinate codes defining reference coordinates, feedrate codes defining relative rates of motion, tool codes identifying tools used to perform operations, spindle codes defining direction and speed of rotation, and auxiliary function codes for controlling operation of selected machine mechanisms. Inputs to programmable controller routines 200 and path generation routines 210 generated by execution of user program instructions under control of the program translator routines 204 results in mechanism function operation and position controlled motion to achieve a cycle of operation in accordance with the definition of the programming convention. Techniques for program controlled interpretation of user programs are known, and known techniques are suitable for practice of the present invention.

Path generation routines 210 effect control of motion of servo controlled actuators to achieve motion according to a predetermined path definition between present and next commanded positions. Path generation routines 210 include interpolation control routines 212 and block processor routines 214. Block processor routines 214 control execution of programmed commands to effect a cycle of operation. Interpolation control routines 212 are used to determine a path length, resolve the path length into departure distances for the commanded axes, and periodically generate position commands for all affected actuators to achieve controlled operation of the actuator to control motion of an associated moveable machine member. The periodic generation of position commands is preferably performed at a predetermined time interval so as to achieve uniform acceleration and velocity conforming to an algorithm of motion control according to departure magnitude, specified velocity and, if applicable, specified acceleration. Techniques for program controlled generation of position commands for servo controls are well known and known techniques are suitable for practice of the present invention.

Subroutine executor routines 220 control execution of programmed subroutines defining machine functioning independently of workpiece programs, and generally relating to operation of particular machine functions or features. Subroutines to be executed by subroutine executor programs 220 generally conform to a programming standard such as EIA RS 274, using the same conventions of axis naming a apply to end-user created workpiece programs. Subroutine executor programs 220 include subroutine block processor programs 222 and subroutine path generation programs 224. Subroutine block processor programs 222 control execution of subroutine commands to produce a cycle of operation from the subroutines. Subroutine path generation programs 224 control generation of auxiliary position commands in response to execution of such subroutines. Such auxiliary position commands are generated at the same predetermined repetition rate as, and are summed with, position commands generated by execution of user defined workpiece programs. Techniques for program controlled execution of machine operation subroutines, including generation of auxiliary position commands for servo controls, are well known and known techniques for processing machine operation subroutines are suitable for practice of the present invention.

Position commands generated under control of either of path generator routines 210 or subroutine executor routines 220 are susceptible of modification by compensation routines 216 to account for characteristics of the particular machine being controlled. Modified position commands are ultimately passed to servo control 100. To facilitate conformance of compensation procedures to requirements of particular machine configurations and characteristics, path generator routines 210 support linkages to compensation routines which are subsequently installed. To this end, such compensation routines are created by, for example, a machine builder, in the course of applying a control to a particular machine, using supported programming languages and following software interface information provided by the control manufacturer. Such compensation routines are installed without modification of the other real-time programs, by simply setting a software "flag" indicating the presence of a compensation routine. Real-time execution of these compensation routines is controlled through program linkages whereby the cycle of operation of the control initiates execution of compensation routines which access position command data and perform compensations thereof. Tilt compensation in accordance with the present invention is advantageously implemented as such a compensation routine.

A cycle of operation of CNC 80 for executing a user program instruction shall be described with reference to FIG. 4. User program instructions may be executed in the manual data input (MDI) mode or in the automatic N/C mode of operation of CNC 80. In the MDI mode, a single instruction block is executed for each operation of Cycle Start push button 98. In automatic N/C mode, execution of instructions of a user defined program continues in the absence of operator intervention until the first to occur of an end-of-program code or other programmed command terminating automatic execution. This difference in operation is effected under control of the program translator routines 204 which control the retrieval and execution of instructions of user program instructions from, for example, user program store 186.

The cycle of operation begins with actuation of Cycle Start push button 98. At processing step 170 an in-cycle status signal is set true. While the in-cycle status signal is true, Cycle Start push button will be illuminated. At decision step 172 it is determined whether a cycle command is active which requires generation of position controlled motion. For example, drilling and milling operation commands require precise rate controlled relative movement of a workpiece and tool achieved by servo controlled actuators acting on moveable machine members. Such machine member motions are contrasted to, for example, tool change commands to exchange tools with a tool storage device which are typically achieved by non-servo controlled actuators. At process step 174, program translator routines 204 respond to commands not requiring position controlled motion by setting values used by programmable logic controller routines 200 to generate the required control signals for the affected machine mechanisms. Thereafter, the in-cycle signal is reset at process step 176 and the cycle of operation is concluded at terminal 178.

Had a cycle command been active which required position controlled motion, execution from decision step 172 would have continued at decision at decision step 130. There it is determined whether the active cycle requires execution of any machine function prior to execution of position controlled motion. For example, if a drill cycle is active and spindle commands are programmed, the defined operation may require that the spindle commands be executed immediately and the feed portion of the drill cycle be effected upon completion of execution of the spindle commands. Under those circumstances, execution would proceed at process step 132 where program translator routines 204 respond to spindle commands to set values used by programmable logic controller routines 202 to execute the spindle commands.

Upon completion of execution of functions at process step 132, execution of the cycle of operation continues at process step 134 where position controlled motion is executed. For example, in a drill cycle, position controlled motion may include rapid positioning to locate a drill relative to a workpiece at a position from which a machining motion is to be initiated, position controlled motion at a user specified feedrate to a desired depth, and rapid return to the position from which the user specified feedrate controlled motion was initiated. Upon completion of position controlled motions, execution of the cycle of operation continues at decision step 136 where it is determined whether any commands are active which require execution of machine mechanism functions upon completion of servo controlled motion. If there are, program translator routines 204 set values for programmable logic controller routines 202 to execute the desired machine mechanism function at process block 174. For example, a spindle stop command may be combined with a drill cycle, causing spindle rotation to be stopped on completion of the drilling operation.

Figure 4:
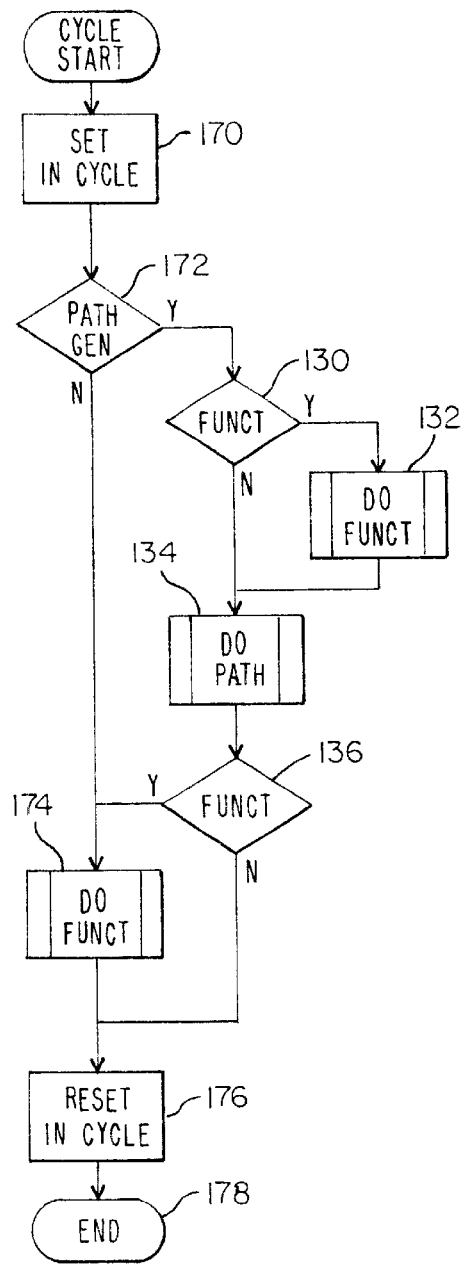
FIG. 4 is a flow chart for a cycle of operation of the machine of FIG. 1.

It will be appreciated that the flow chart of FIG. 4 is illustrative only of an example of a cycle of operation to be effected by CNC 80. Other cycles of operation may be defined which are suitable in the practice of the present invention.

It is desired to control motions of all machine members to achieve relative movement of a tool and workpiece according to a user created workpiece machining program. Coordinated motion of machine members is required to produce surfaces in the finished workpiece which are not parallel to axes of motion of machine members. In general, each actuator is controlled by a servomechanism control providing, at least, position and velocity control to facilitate controlled machining of the workpiece in accordance with process parameters defining a rate of workpiece material removal. Where coordinated motion of plural machine members is required, total departure distances are subdivided into increments, typically according to a time based path generation algorithm that periodically determines machine member incremental distances according to specified velocity and a predetermined, constant repetition rate interval.

A position command axis is associated with each servo controlled machine moveable member. User control programs conform to dimensional definitions for these axes, defining positions as multiples of a selected resolution. Transitory machine member commands may be specified in English or metric units of linear measure. Rotary machine member commands may be specified in degrees or radians. Measured position from transducers 108, 114, 115, 116, 117, 188 is likewise defined in resolution units. Ordinarily, differences between command position resolution units and measured position resolution units is readily accommodated by scale factors to match commanded and measured position.

Each position controlled motion will be effected under control of path generator routines 210 periodically producing position commands defining increments of motion for servo control 100. The magnitude of these position commands are determined according to the predetermined repetition rate at which they are produced and the instantaneous velocity of the command axis at the time the command is produced. A path generation control algorithm provides for controlled acceleration and deceleration for changes of velocity of the affected command axes in accordance with departure magnitude as is conventional. The user program generally specifies coordinates for affected machine members and velocities at which motions are to be effected. Provided adequate displacement is so specified, the machine members will undergo uniform acceleration to the specified velocity, proceed at the specified velocity to a location from which deceleration is required to reach a final velocity, and decelerate to a final velocity. The acceleration, constant velocity and deceleration portions of each motion are effected in accordance with the user program specified coordinates and velocities and a predetermined algorithm of motion control. The generation of each position command applies the active acceleration rate to the repetition rate interval to determine instantaneous velocity for the interval. Departure distances in each affected command axis are thus divided into increments of motion effected over the intervals defined by the repetition rate, assuming that the motion of all affected command axes is coordinated to complete the programmed change of position simultaneously.

As the relationship between linear displacement of crank arms comprising screws 34, 40 and the respective tilt swings B, A are non-linear, linear scaling between measured position resolution units and command position units will not correct for the non-linearity. While position measurement for these axes could be effected at the machine members, overcoming the non-linearity for purposes of position measurement, velocity variations according to the non-linear relationship would occur in the actual speed of the pivoting members. Such velocity variations could be accommodated by variation of the servomechanism control gain in accordance with the non-linear relationship. However, such gain variations are generally not accommodated by commercially-available machine controls. Consequently, applicants have chosen to effect position measurement of the linear displacement of the crank arms defined by screws 34, 40, and to apply linear scaling to match the position measurement resolution units to the position command resolution units. Position commands are compensated to account for the non-linear relationship between the linear displacement and angular displacement.

Compensation of position commands in accordance with the present invention is effected as a compensation procedure executed in the course of generation of commands for servo control 100. A procedure for effecting position command compensation in accordance with the present invention is described herein. Compensation values for position commands for tilt axes are derived from position command values, and the linear displacement of the translating component of the linear actuator corresponding to the commanded angular position. This linear displacement is determined according to the "Law of Cosines" as applied to a triangle formed by the linear displacement, two sides having lengths defined by the machine, and an included angle between those two sides determined by the commanded position. This triangle is depicted in FIG. 2. The first of the two sides is the line from the pivot point of the machine member to a first point from which displacements of the translating component are measured (first distance). The second of the two sides is the line from the pivot point of the machine member to a second point at which torque is applied to the machine member (second distance). The displacement is calculated from the following equation (Eqn. 1):

$$S = SQRT(k1 - (k2*COS(POSCMD + OFS1)))$$

where:
SQRT is the square root function;
k1=sum of square of first distance and square of second distance;
k2=twice the product of first distance and second distance;
OFS1=position command reference offset; and,
S=linear displacement between first point and second point to produce angle of POSCMD.

Compensation values are calculated according to the Law of Cosines using the following equation (Eqn. 2):

$$POSCMP = SCL*(S) + OFS2 - POSCMD$$

where:
SCL is the ration of total angular range to total linear range;
SQRT is the square root function;
k1=sum of square of first distance and square of second distance;
k2=twice the product of first distance and second distance;

OFS1=position command reference offset;
OFS2=machine position reference offset;
POSCMD=commanded position; and,
POSCMP=position compensation.

Programming convention for tilt swings illustrated in FIG. 1 advantageously uses vertical as the reference for position commands, permitting positive and negative magnitudes relative to vertical. To conform the position commands to the reference for tilt angles of the machine illustrated in FIG. 1, a first reference offset value (OFS1) is applied to the position commands used in the calculation of Eqn. 1. To conform the calculated compensation to the reference of the position commands, a second offset value (OFS2) is applied to the calculated machine member position (SCL*(S)) of Eqn. 2.

Figure 5:
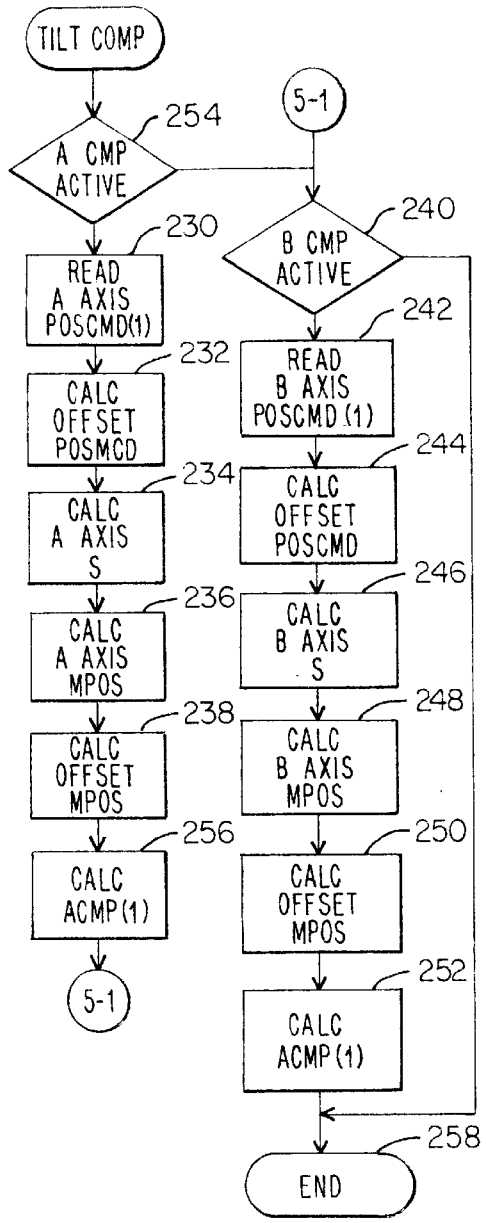
FIG. 5 is a flow chart for a procedure for compensating position commands in accordance with the invention.

FIG. 5 is a flow chart of a procedure for producing compensation values in accordance with Eqn. 1 and Eqn. 2. The procedure is implemented as a routine executed with the periodic generation of position commands by real-time data processor 88. The compensation values produced by execution of this procedure are summed with the position commands produced by execution of the user program from which tilt swing position commands are generated. Referring to FIG. 5, execution of the compensation subroutine begins at decision step 254 where it is determined whether A axis compensation is active. If not, execution continues at decision step 240 where it is determined whether B axis compensation is active. If not, further processing of the tilt swing compensation procedure is not required and the procedure is exited at terminal block 258.

Had it been determined at decision step 254 that A axis compensation were active, execution of the tilt compensation procedure would continue at process step 230 wherein the A axis position command (POSCMD(1)) for the current repetition interval is read. At process step 232 the A axis reference offset (OFS1) is added to the A axis position command. At process step 234 an A axis linear displacement (S), establishing position of the A axis drive nut along screw 40 corresponding to the commanded angular position, is calculated from the axis angle, the A axis first distance and the A axis second distance is accordance with Eqn. 1. At process step 236, the A axis linear distance is scaled to produce an angular value relative to the A axis machine angular reference (MPOS). At process step 238 the A axis reference offset (OFS2) is added to the angular value (MPOS) to convert the machine position angular value to the command position reference. At process step 256, a compensation value is calculated as the difference between the A axis position command and the offset calculated machine position. Thereafter, execution of the tilt axis compensation routine proceeds at decision step 240 through connector 5-1.

Had it been determined at decision step 240 that B axis compensation is active, a procedure duplicating that described for A axis compensation is executed as illustrated by process steps 242 through 252 using the B axis values of position command, B axis reference offsets (OFS1, OFS2) and B axis first and second distances. Upon completion of calculation of a B axis compensation value at process step 252, tilt axis compensation procedure execution is exited through terminal 258.

While applicants' preferred technique to compensate position commands is by calculation of compensation values as described, applicants contemplate use of a table of pre-calculated compensation values, each being effective over a predetermined range of position commands. Position commands would be compensated by selecting a compensation value from the table according to the value of the current position command, and applying the compensation value to the position command. This technique has the advantage of reducing the number of calculations required during machining, but requires storage capacity for the compensation values. Compensation values for this technique could be calculated according to the following equation (Eqn. 3):

$$DPCMP=SCL*(SQRT(k1-(k2*COS(POSCMD+OFS1)))+OFS2-POSCMD$$

where:
SCL is the ratio of total angular displacement to total linear displacement;
SQRT is the square root function;
k1=sum of square of first distance and square of second distance;
k2=twice the produce of first distance and second distance;
OFS1=position command reference offset;
OFS2=position compensation reference offset;
POSCMD=commanded position; and,
DPCMP=compensation for $R1 \leq POSCMD \leq R2$, where:
R1=lower limit of POSCMD to produce DPCMP; and,
R2=upper limit of POSCMD to produce DPCMP.

While the invention has been illustrated by reference to preferred embodiments, and such preferred embodiments have been described in considerable detail with reference to the drawings, it is not the intention of applicants that the invention be restricted to such detail. Rather, it is the intention of the applicants that the invention be defined by the scope of the appended claims and all equivalents of the preferred embodiments falling within the scope thereof.

We claim:

1. A method for control of motion of a machine member pivotable about a pivot point and propelled by a linear actuator with a translating component displaceable from a first point at a first distance from the pivot point and applying a torque to the member at a second point a second distance from the pivot point, the method comprising the steps of:
   generating position commands defining angular displacement of the machine member;
   determining an equivalent linear displacement required of the linear actuator to place the machine member at the position defined by the position command; and,
   controlling motion of the machine member in response to the equivalent linear displacement.

2. The method of claim 1, wherein the equivalent linear displacement is determined according to the following relationship:

$$S=SQRT(k1-(k2*COS(POSCMD+OFS1))$$

where:
SQRT is the square root function;
k1=sum of square of first distance and square of second distance;
k2=twice the product of first distance and second distance;
OFS1=position command reference offset;
POSCMD=position command; and,
S=linear displacement between first point and second point to produce a tilt angle defined by POSCMD.

3. The method of claim 2, wherein the step of controlling motion of the machine member further comprises the steps of:

compensating the position commands by a compensation value derived from said linear displacement;

applying the compensation value to the position command used to produce said compensation value; and controlling motion of the machine member in response to the compensated position command.

4. The method of claim 3, wherein acceleration and velocity of the machine member are uniform and conform to a predetermined algorithm of motion control according to displacement magnitude and, at least, specified velocity.

5. The method of claim 3, wherein position commands are periodically produced, each position command representing an angular displacement to be effected over a predetermined time period and the step of controlling motion of the machine member effects motion through the angular displacement during the predetermined time period.

6. The method of claim 5, wherein the step of selecting a compensation value further comprises the step of associating the position command with one of a plurality of predetermined compensation values according to a selection algorithm by which each compensation value is associated with a range of values of a position command.

7. The method of claim 5, wherein each compensation value is calculated according to the following relationship:

$$DPCMP=SCL*(SQRT(k1-(k2*COS(POSCMD+OFS1)))+OFS2-POSCMD$$

where:

SCL is the ratio of total angular displacement to total linear displacement;

SQRT is the square root function;

k1=first distance;

k2=second distance;

OFS1=position command reference offset;

OFS2=position compensation references offset;

POSCMD=position command; and,

DPCMP=compensation for R1≦POSCMD≦R2, wherein R1 is the lower limit of POSCMD to produce DPCMP, and wherein R2 is the upper limit of POSCMD to produce DPCMP.

8. The method of claim 3, wherein compensation values are produced according to the following relationship:

$$POSCMP=SCL*(SCRT(k1-(k2*COS(POSCMD+OFS1)))+OFS2-POSCMD$$

where:

SCL is the ratio of total angular displacement to total linear displacement;

SQRT is the square root function;

k1=sum of square of first distance and square of second distance;

k2=twice the product of first distance and second distance;

OFS1=position command reference offset;

OFS2=position compensation references offset;

POSCMD=position command; and,

POSCMP=position compensation.

9. The method of claim 3, wherein the step of compensating the position commands further comprises the steps of:

selecting a compensation value according to the value of the position command; and, applying the selected compensation value to the position command.

10. An apparatus for control of motion of a machine member pivotable about a pivot point and propelled by a linear actuator with a translating component displaceable from a first point at a first distance from the pivot point and connected to the member at a second point a second distance from the pivot point, the apparatus comprising:

a numerical controller for generating position commands defining angular displacement of the machine member;

a data processor responsive to the position commands for determining an equivalent linear displacement required of the linear actuator to place the machine member at the position defined by the position command; and, a servomechanism control for controlling motion of the machine member in response to the equivalent linear displacement.

11. The apparatus of claim 10, wherein the data processor determines the equivalent linear displacement according to the following relationship:

$$S=SQRT(k1-(k2*COS(POSCMD+OFS1))$$

where:

SQRT is the square root function;

k1=sum of square of first distance and square of second distance;

k2=twice the product of first distance and second distance;

OFS1=position command reference offset;

POSCMD=position command; and,

S=linear displacement between first point and second point to produce a tilt angle defined by POSCMD.

12. The apparatus of claim 11, wherein the numerical controller periodically produces position commands representing an angular displacement to be effected over a predetermined time period and the servomechanism control effects motion of the machine member through the angular displacement during the predetermined time period.

13. The apparatus of claim 12, wherein acceleration and velocity of the machine member are uniform and conform to a predetermined algorithm of motion control according to displacement magnitude and, at least, specified velocity.

14. The apparatus of claim 10, wherein the data processor compensates position commands by a compensation value derived from said linear displacement and applies the compensation value to the position command used to produce said compensation value and the servomechanism control controls motion of the machine member in response to the compensated position command.

15. The apparatus of claim 14, wherein compensation values are produced according to the following relationship:

$$POSCMP=SCL*(SCRT(k1-(k2*COS(POSCMD+OFS1)))+OFS2-POSCMD$$

where:

SCL is the ratio of total angular displacement to total linear displacement;

SQRT is the square root function;

k1=sum of square of first distance and square of second distance;

k2=twice the product of first distance and second distance;

OFS1=position command reference offset;

OFS2=position compensation references offset;

POSCMD=position command; and,

POSCMP=position compensation.

16. The apparatus of claim 14, wherein the data processor compensates the position commands by selecting a compensation value according to the value of the position command and applying the selected compensation value to the position command.

17. The apparatus of claim 16, wherein the data processor associates the position command with one of a plurality of predetermined compensation values according to a selection algorithm by which each compensation value is associated with a range of values of a position command.

18. The apparatus of claim 17, wherein each compensation value is calculated according to the following relationship:

$$DPCMP=SCL*(SQRT(k1-(k2*COS(POSCMD+OFS1)))+OFS2-POSCMD$$

where:
- SCL is the ratio of total angular displacement to total linear displacement;
- SQRT is the square root function;
- k1=first distance;
- K2=second distance;
- OFS1=position command reference offset;
- OFS2=position compensation references offset;
- POSCMD=position command; and,
- DPCMP=compensation for $R1 \leq POSCMD \leq R2$, wherein R1 is the lower limit of POSCMD to produce DPCMP, and wherein R2 is the upper limit of POSCMD to produce DPCMP.

* * * * *